(12) United States Patent
Allen et al.

(10) Patent No.: US 8,225,324 B2
(45) Date of Patent: Jul. 17, 2012

(54) RESOURCE MANAGEMENT ON A COMPUTER SYSTEM UTILIZING HARDWARE AND ENVIRONMENTAL FACTORS

(75) Inventors: Paul V. Allen, Rochester, MN (US); Thomas A. Budnik, Rochester, MN (US); Mark G. Megerian, Rochester, MN (US); Samuel J. Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 12/121,096

(22) Filed: May 15, 2008

(65) Prior Publication Data

US 2009/0288094 A1    Nov. 19, 2009

(51) Int. Cl.
G06F 9/46    (2006.01)
(52) U.S. Cl. .......................................... 718/104; 718/1
(58) Field of Classification Search .................... None
See application file for complete search history.

(56) References Cited

U.S. PATENT DOCUMENTS

| | | |
|---|---|---|
| 5,878,241 A | 3/1999 | Wilkinson et al. |
| 5,961,642 A | 10/1999 | Lewis |
| 6,366,945 B1 * | 4/2002 | Fong et al. ..................... 718/104 |
| 6,453,426 B1 | 9/2002 | Gamache et al. |
| 6,671,699 B1 | 12/2003 | Black et al. |
| 6,711,691 B1 * | 3/2004 | Howard et al. ............... 713/300 |
| 6,854,009 B1 | 2/2005 | Hughes |
| 7,010,617 B2 | 3/2006 | Kampe et al. |
| 7,475,274 B2 | 1/2009 | Davidson |
| 7,506,335 B1 | 3/2009 | Wooff et al. |
| 7,664,836 B2 | 2/2010 | Kim |
| 7,694,305 B2 * | 4/2010 | Karlsson et al. .............. 718/105 |
| 7,702,965 B1 | 4/2010 | Planki et al. |
| 7,818,010 B2 * | 10/2010 | Matteo et al. ................. 455/450 |
| 2001/0042123 A1 * | 11/2001 | Moody et al. ................. 709/226 |
| 2002/0069235 A1 * | 6/2002 | Chen ............................. 709/104 |
| 2003/0084088 A1 * | 5/2003 | Shaffer ......................... 709/104 |
| 2003/0177296 A1 | 9/2003 | Kurth |
| 2004/0210648 A1 | 10/2004 | Woodruff |
| 2005/0141554 A1 * | 6/2005 | Hammarlund et al. ........ 370/468 |
| 2005/0155033 A1 * | 7/2005 | Luoffo et al. ................. 718/104 |
| 2005/0198641 A1 * | 9/2005 | Eilam et al. ................... 718/104 |
| 2005/0278523 A1 | 12/2005 | Fortin et al. |
| 2005/0289362 A1 * | 12/2005 | Merkin et al. ................ 713/300 |
| 2006/0190505 A1 | 8/2006 | DeMaio et al. |
| 2006/0270413 A1 * | 11/2006 | Matteo et al. ................. 455/450 |
| 2007/0112864 A1 * | 5/2007 | Ben-Natan .................... 707/200 |
| 2008/0040541 A1 | 2/2008 | Brockmann |
| 2008/0177867 A1 | 7/2008 | Giampapa et al. |
| 2008/0201468 A1 | 8/2008 | Titus |
| 2008/0288746 A1 | 11/2008 | Inglett et al. |
| 2009/0024830 A1 | 1/2009 | Budnik et al. |
| 2009/0300625 A1 * | 12/2009 | Branson et al. ............... 718/102 |

OTHER PUBLICATIONS

U.S. Appl. No. 11/780,072, filed Jul. 19, 2007, "Executing Multiple Instructions Multiple Data ('MIMD') Programs on a Single Instruction Multiple Data ('SIMD') Machine" by Thomas A, Budnik et al.

* cited by examiner

Primary Examiner — Idriss N Alrobaye
(74) Attorney, Agent, or Firm — Rabin & Berdo, P.C.

(57) ABSTRACT

A method for resource management on a computer system utilizing hardware and environmental information. A caller interacts with an application program interface to handle information requests with a persistent data storage device to combine information involving hardware resource information, environmental data and other system information, all both historical, present and predicted values. Application execution decisions may then made regarding hardware for the calling entity. The method may be implemented as a computer process.

17 Claims, 7 Drawing Sheets

RESOURCE MANAGEMENT ON A COMPUTER SYSTEM UTILIZING HARDWARE AND ENVIRONMENTAL FACTORS

CROSS REFERENCE TO RELATED APPLICATIONS

This present application is related to U.S. patent applications entitled—"Configurable Persistent Storage on a Computer System Using a Database" and "Scaling and Managing Work Requests on a Massively Parallel Machine", filed concurrently herewith, and respectively assigned application Ser. Nos. 12/121,172 and 12/121,262.

BACKGROUND

This invention relates to resource management. More specifically, it relates to resource scheduling on computer systems utilizing hardware and environmental factors.

Computer systems are composed of many different components. These components may be either hardware or software resources. Massively parallel computer systems are an example of these computer systems. These systems are composed of nodes, or connection points. These nodes may serve as input or output (I/O) points, or points that perform a computational function and forward on data. On these machines, there are many ways to schedule resources, and to utilize the machine in a most efficient manner. Most of these techniques use system interfaces to learn about the topology of the machine and the state of various nodes, and create or utilize partitions of available nodes to submit jobs. An interface is an intermediary between a calling entity and a back-end entity. The back-end entity often may be a server or a data source such as a database. The intermediary can be implemented in several ways. In a three-tier architecture, it may be a background process that intercepts requests from a caller. Or, it may be implemented as an application program interface.

The interaction between the calling entity and the interface and the data source is a complicated one, since it can include such issues as: the number of nodes required for the application being submitted, whether the application needs the nodes interconnected in a three-dimensional mesh to use message passing interface (MPI) logic, whether a fully interconnected three-dimensional torus is needed to ensure uniform performance of MPI across all the nodes and none of the edges of the three-dimensional mesh, whether there is an optimal shape of the nodes in the three-dimensional space that will result in the best performance and the duration of time needed to run the job. There are many other factors in this area of resource and workload management. Tools such as SLURM, Load Leveler, Condor, Altair and others have been created to tackle this problem.

Hardware can overheat to the point that it may fail and certain jobs have been shown to heat up computer chips to a higher degree than other jobs. Anomalies in the airflow, fan speeds, room layout, or even load on the air cooling facilities can result in hot spots in the machine. It would be beneficial for certain crucial applications, especially ones that will have a long running duration, where time would be wasted by a failure in the middle due to over-temperature errors, to run on an area of the machine that is running at a lower temperature.

Historical temperature data are also stored. Where such data provides correlation information between all past jobs and all past environmental readings, it is possible to take into consideration the jobs that been shown to increase the temperature of the machine during past runs and be more selective about scheduling these jobs for future runs. Though temperature was used as the example in this discussion, the same notion may be applied to any other values, such as voltage, current, fault rates, fan speeds and any other parameter that may be contemplated by a person having ordinary skill in the art.

BRIEF SUMMARY

A method for resource management on a computer system utilizing hardware and environmental information. A caller interacts with an application program interface to handle information requests with a persistent data storage device to combine information involving hardware resource information, environmental data and other system information, all historical, present and predicted values. Application execution decisions may then be made regarding hardware for the calling entity. This combines the two disciplines of hardware monitoring and resource management to take environmental readings into consideration when doing resource management of a massively parallel machine. The method may be implemented as a computer process.

DETAILED DESCRIPTION

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment of the invention, persistent data is stored in a database, such that every piece of hardware, every running or completed job, and every recorded environmental reading all reside on the database. Resource management tools, also called schedulers, may contact an abstraction layer for the massively parallel computer to determine the layout of the machine, determining what areas are not currently busy. The resource management tools then use this information to find the best fit for the jobs that the users want to submit.

Figure 1:
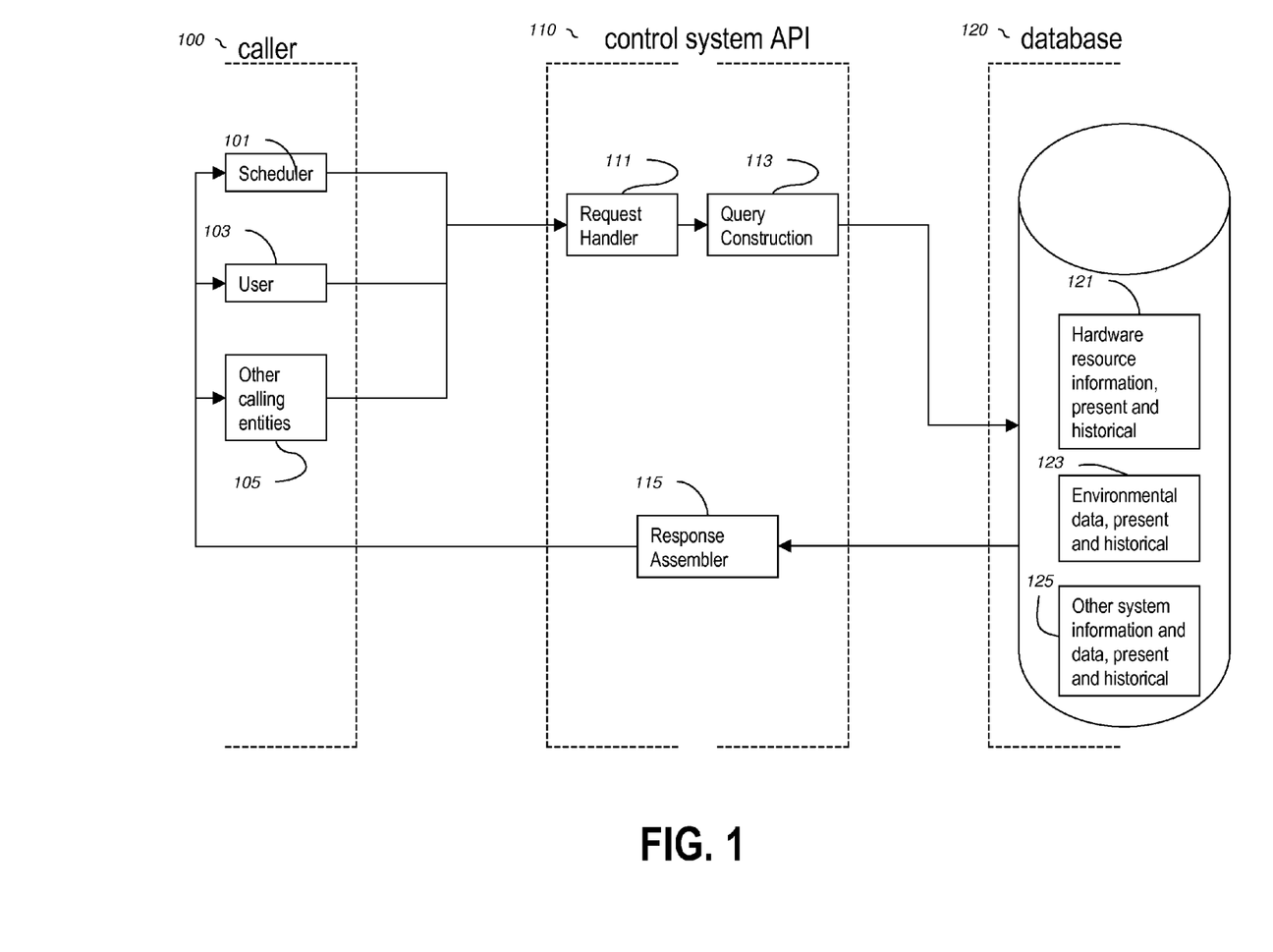
FIG. 1 is an interaction diagram depicting the interactions between calling entities, a middle application program interface and a database.

In FIG. 1, an interaction diagram depicts one embodiment of the present invention. Callers (100) interact with the massively parallel machine's control system application program interface (API) (110). This abstract layer then interacts with a persistent storage device, in this case a database (120).

A caller may be the system's resource scheduler (101), a human being user seeking information regarding the hardware resources and environmental data (103) or any other entity (105) that interacts with the API (110). Other examples include other system processes, such as operating system security processes or program applications that need to perform calculations on the network of nodes of the massively parallel machine. It is contemplated that one having ordinary skill in the art will be able to consider other such calling entities.

The API (110) first encounters the caller's requests with a request handler (111). In one embodiment of the invention, this request handler can forward the request on to a module to construct a query based on the request (113). An alternative embodiment may have the request handler do load balancing or priority handling before handing off the request. The query construction module will formulate the back-end query that will interact with the database (120), performing the necessary select, join and other database selection tasks to procure the requested data.

The database (120) contains all the persistent data for the massively parallel machine. It contains hardware resource information, both present and historical information (121). It also includes environmental data, also present and historical (123). And finally, it also includes any other system information and data both present and historical that may be relevant to the query (125). Examples of this may include the system date and time and privacy and security settings to view certain data. In another embodiment of the invention, the data may include in addition to present and historical, future anticipated values, based on statistical rendering or modeling. It is contemplated that one having ordinary skill in the art will be able to consider other relevant data.

The API (110) will receive the response from the database (120) and assemble the returned results with a response assembler module (115). This module would then pass on the result back to the calling entity (100).

Figure 2:
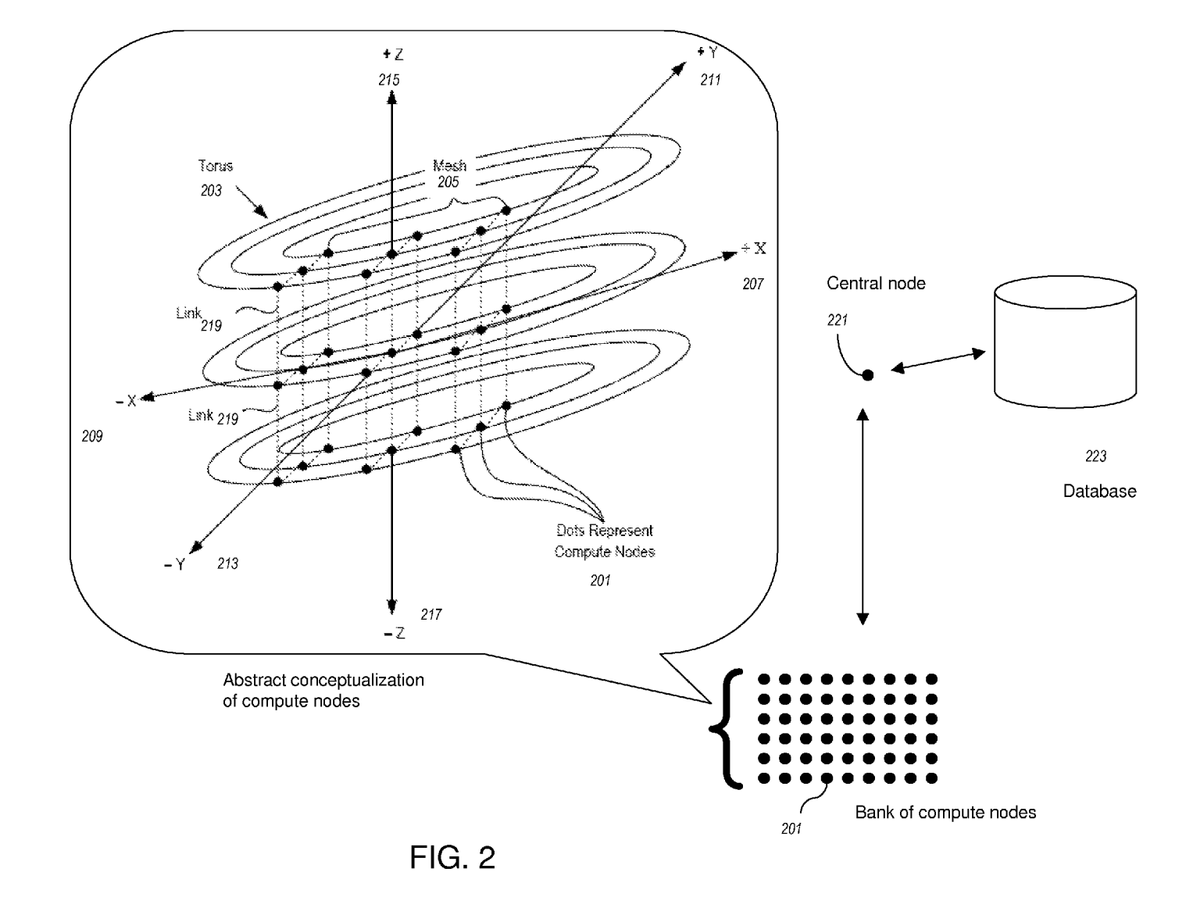
FIG. 2 is a diagram depicting an embodiment of the layout of the massively parallel machine and a database.
Figure 3:
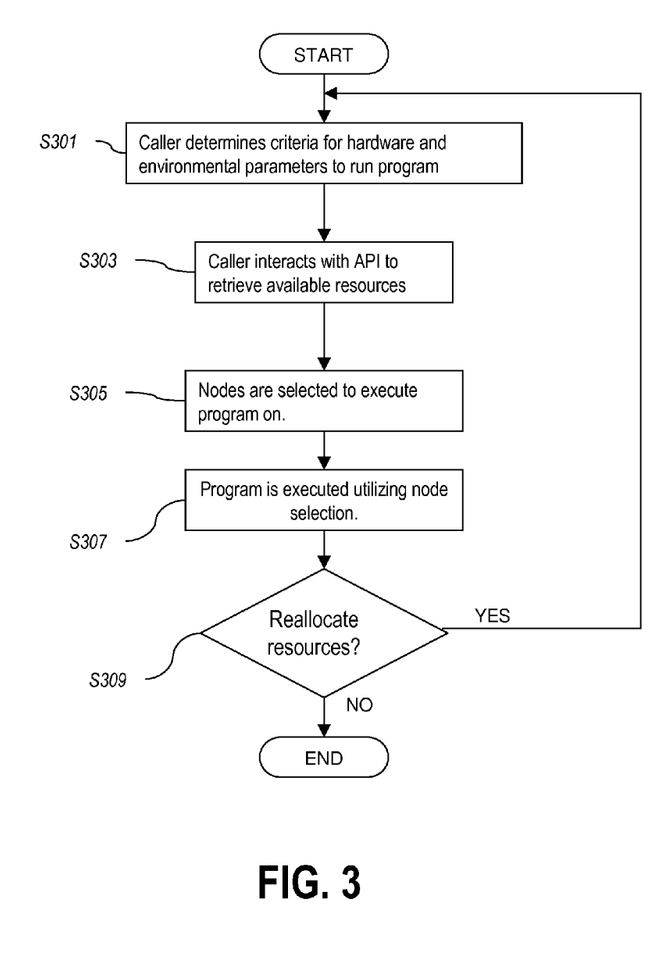
FIG. 3 is a flowchart showing the steps in a method to allocate resources according to hardware and environmental information.

What the calling entity will do with the information in one embodiment of the invention is depicted in FIG. 2 and FIG. 3. For clarity purposes, FIG. 2 illustrates an exemplary data communications network optimized for point to point operations and the relationship of these nodes. In FIG. 2, dots represent compute nodes (201) of a massively parallel machine, and the dotted lines between the dots represent data communications links (219) between compute nodes. The data communications links may be implemented with point to point data communications adapters, with data communications links on three axes, x, y, and z, communicating in six directions: +x (i.e. 207 in FIG. 2), −x (209), +y (211), −y (213), +z (215), and −z (217). The links and compute nodes are organized by this data communications network optimized for point to point operations into a three dimensional mesh (205) that wraps around to form a torus (203). Each compute node in the torus has a location in the torus that is uniquely specified by a set of x, y, z coordinates. For clarity of explanation, FIG. 2 is illustrated with only 27 compute nodes, but one having skill in the art will recognize that a data communications network optimized for point to point operations in accordance with embodiments of the present invention may contain only a few compute nodes or may contain thousands of compute nodes.

This central node (221) (there is at least one central node, and alternative embodiments of the invention may have more than one) would always be available to other nodes (of which 201 is one) in the massively parallel machine. The central node interacts directly with a data storage device (223), in this case a database. Certain information regarding these nodes may be stored on the database that would be relevant to running an application. For instance, if an application needs to be run on the nodes with the lowest average temperatures that are physically adjacent to one another, this information would be available in the database and would need to be assembled. Another example is that an application may want to be run on nodes with the lowest temperature historically for a given time range, not just in the immediate present.

FIG. 3 traces an embodiment of this decision process. In S301, a caller (100) determines the criteria for hardware and environmental parameters that are relevant. This could be, as in the previous examples nodes with certain temperature or topology characteristics. The caller interacts with the API (110) to retrieve the available resources it desires in S303. Subsequently, the interactions in FIG. 1 take place and the nodes are selected to execute the program on them in S305. The program then executes the program on the selected nodes in S307. If there is a need to reallocate resources in S309, then the entire process is begun again by starting at S301 again. Otherwise, the node selection remains in place and this hardware and environmental resource node selection process concludes. An example of why there would need to be a reallocation of resources is that an extremely lengthy application that will require a long period of time to run, may cause overheating or other resource exhaustion. It may be in the best interest of the system and the caller to reassess the situation periodically in S309. It is contemplated that one having ordinary skill in the art will be able to consider other such scenarios or needs for a calling entity.

Figure 4:
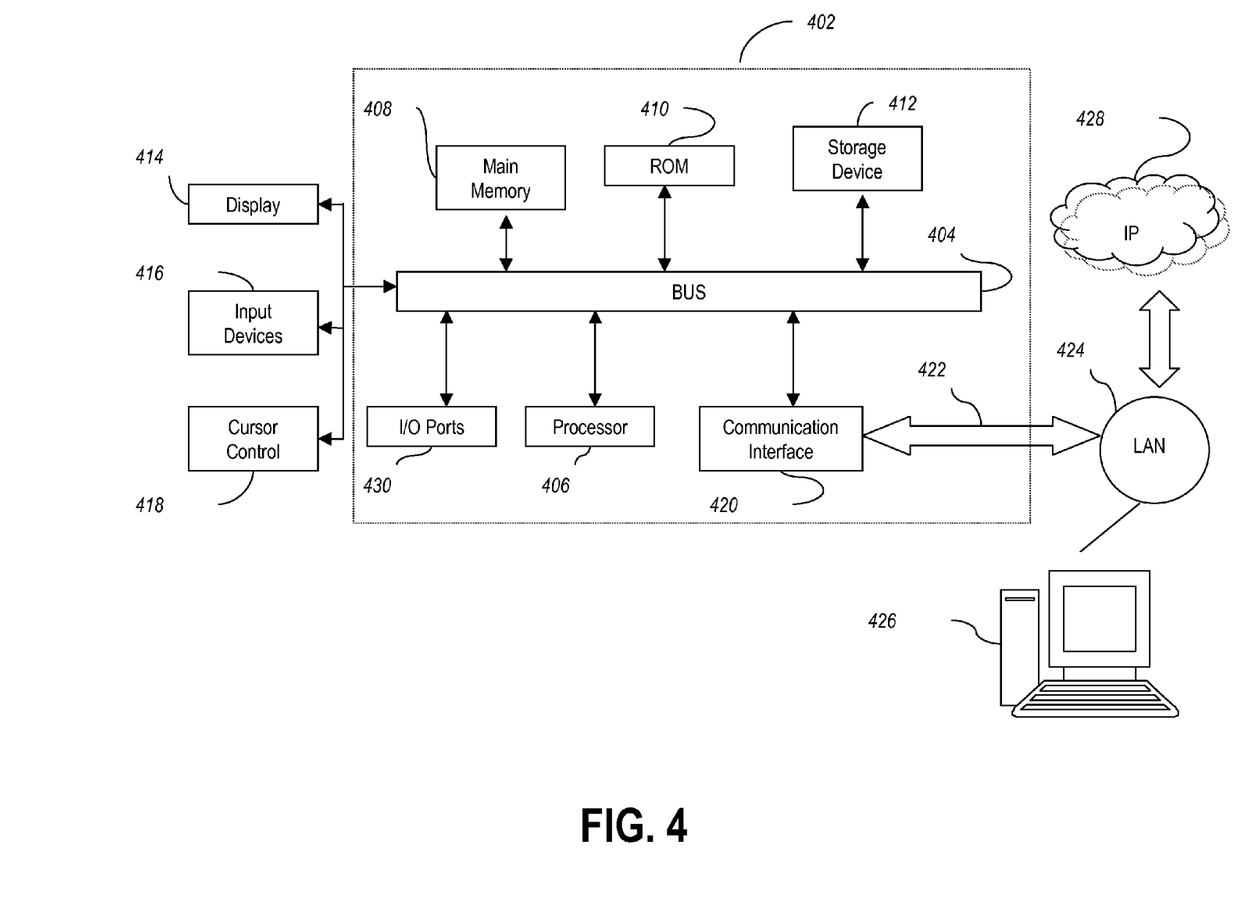
FIG. 4 is a conceptual diagram of a computer system.

The API code may be implemented in a number of ways including via computer hardware or via a computer program product. FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) 410 or other static storage device (e.g., programmable ROM (PROM), erasable PROM (EPROM), and electrically erasable PROM (EEPROM)) coupled to bus 404 for storing static information and instructions for processor. A storage device (412), such as a magnetic disk or optical disk, is provided and coupled to bus for storing information and instructions. This storage device is an example of a computer readable medium, upon which the program may be encoded.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 7. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card.

The computer system includes input devices, such as a keyboard (416) and a cursor control (418), for communicating information and command selections to processor (406). Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hardwired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line. Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (426) through local network (424) (e.g., a LAN) or through equipment operated by a service provider, which provides communication services through a communications network (428). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

An alternative embodiment of the present invention may be in the form a computer process running on one or more of the nodes of the massively parallel machine. The process software may then be deployed or integrated to the computer system and made available over a Virtual Private Network.

1. Deployment

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then detached to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 5:
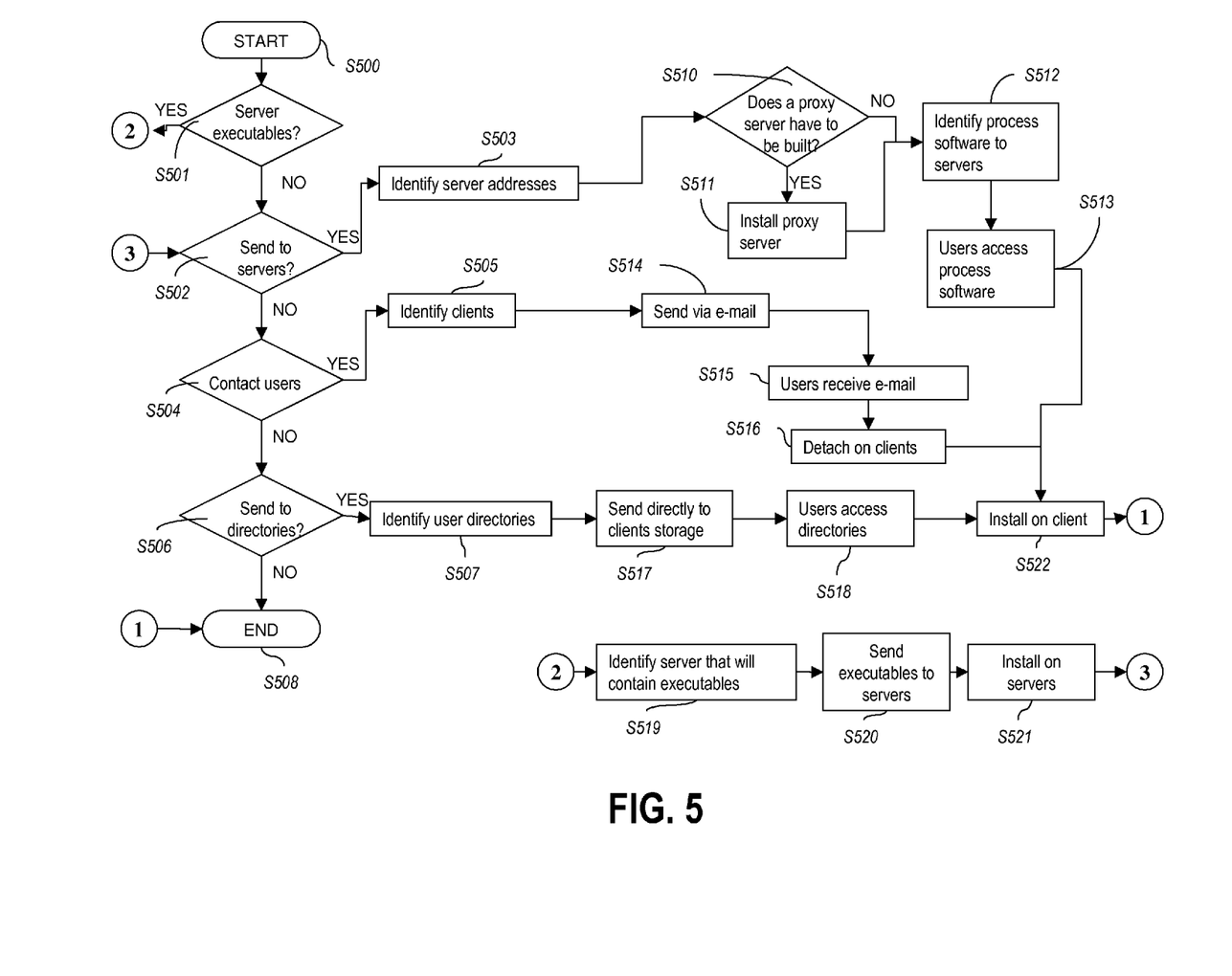
FIG. 5 is a flowchart showing the steps in deployment of the service software to a computer system.

In FIG. 5, S500 begins the deployment of the process software. The first thing is to determine if there are any programs that will reside on a server or servers when the process software is executed (S501). If this is the case then the servers that will contain the executables are identified (S519). The process software for the server or servers is transferred directly to the servers' storage via FTP or some other protocol or by copying though the use of a shared file system (S520). The process software is then installed on the servers in S521.

Next, a determination is made on whether the process software is be deployed by having users access the process software on a server or servers (S502). If the users are to access the process software on servers then the server addresses that will store the process software are identified in S503.

A determination is made if a proxy server is to be built (S510) to store the process software. A proxy server is a server that sits between a client application such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server installed in S511. The process software is sent to the servers either via a protocol such as FTP or it is copied directly from the source files to the server files via file sharing in S512. Another embodiment would be to send a transmission to the servers that contained the process software and have the server process the transaction, then receive and copy the process software to the server's file system. Once the process software is stored at the servers, the then access users via their client computers the process software on the servers and copy it to their client computers file systems (S513). Another embodiment is to have the servers automatically copy the process software to each client and then run the installation program for the process software at each client computer. The user executes the program that installs the process software on his client computer (S522) then exits the process in S508.

In S504 a determination is made whether the process software is to be deployed by sending the process software to users via e-mail. The set of users where the process software will be deployed are identified together with the addresses of the user client computers in S505. The process software is sent via e-mail to each of the users' client computers. The users then receive the email (S515) and then detach the process software from the e-mail to a directory on their client computers in S516. The user executes the program that installs the process software on his client computer (S522) then exits the process in S508.

Lastly a determination is made on whether to the process software will be sent directly to user directories on their client computers in S506. If so, the user directories are identified in S507. The process software is transferred directly to the user's client computer directory in S517. This can be done in several ways such as but not limited to sharing of the file system directories and then copying from the sender's file system to the recipient users file system or alternatively using a transfer protocol such as File Transfer Protocol (FTP). The users access the directories on their client file systems in preparation for installing the process software in S518. The user executes the program that installs the process software on his client computer in S522 then exits the process in S508.

2. Integration

In an embodiment of the invention, the process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6:
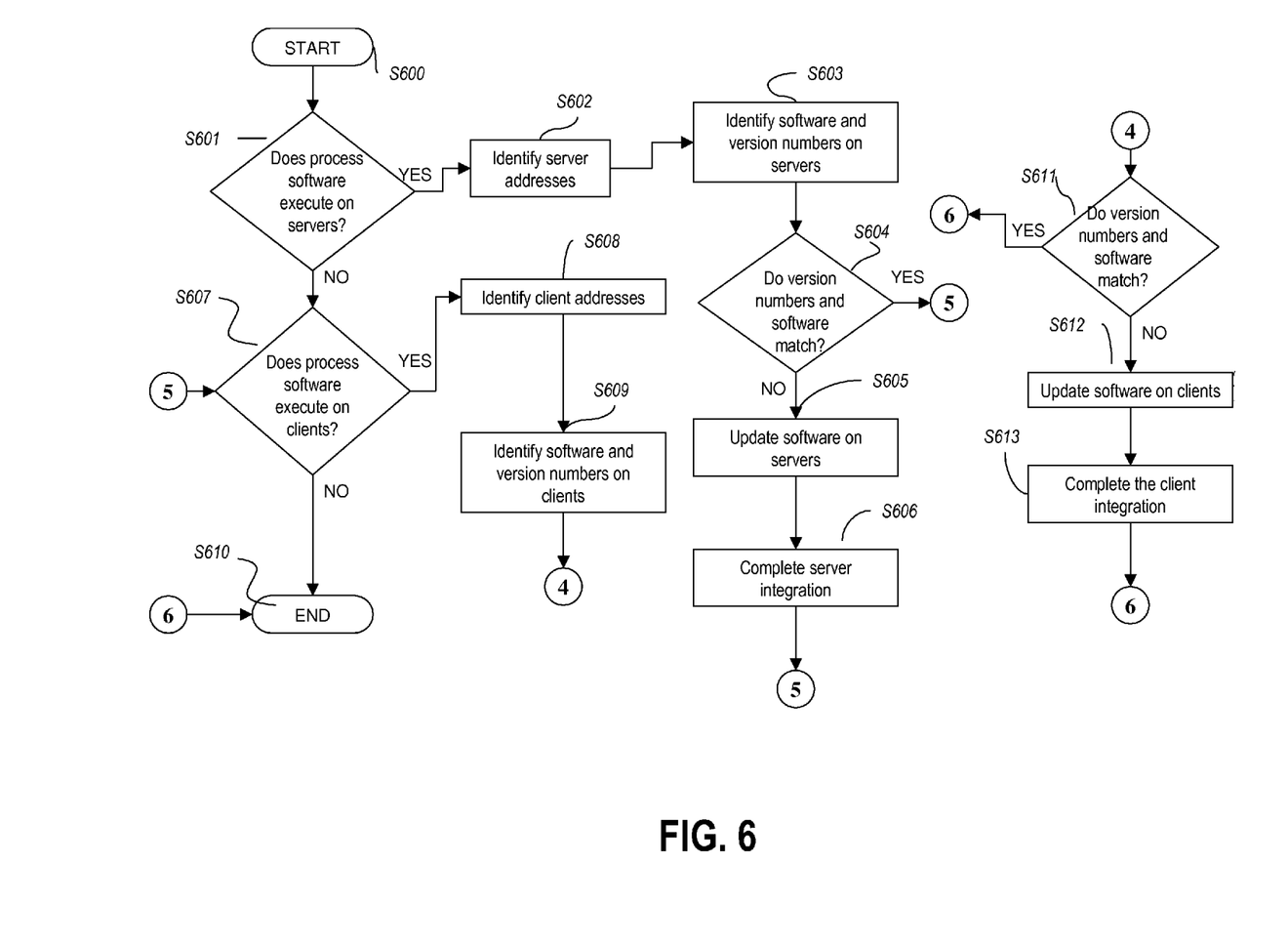
FIG. 6 is a flowchart showing the steps in integration of the service software to a computer system.

In FIG. 6, S600 begins the integration of the process software. The first thing is to determine if there are any process software programs that will execute on a server or servers in S601. If this is not the case, then integration proceeds to S607. If this is the case then the server addresses are identified in S602. The servers are checked to see if they contain software that includes the operating system (OS), applications and network operating systems (NOS). together with their version numbers, that have been tested with the process software in S603. The servers are also checked to determine if there is any missing software that is required by the process software in S603.

A determination is made if the version numbers match the version numbers of OS, applications and NOS that have been tested with the process software in S604. If all of the versions match and there is no missing required software the integration continues in S607.

If one or more of the version numbers do not match then the unmatched versions are updated on the server or servers with the correct versions S605. Additionally if there is missing required software then it is updated on the server or servers in S605. The server integration is completed by installing the process software in S606.

S607 which follows either S601, S604 or S606 determines if there are any programs of the process software that will execute on the clients. If no process software programs execute on the clients the integration proceeds to S610 and exits. If this not the case, then the client addresses are identified in S608.

The clients are checked to see if they contain software that includes the operating system (OS), applications, and network operating systems (NOS), together with their version numbers, that have been tested with the process software in S609. The clients are also checked to determine if there is any missing software that is required by the process software in S609.

A determination is made is the version numbers match the version numbers of OS, applications and NOS that have been tested with the process software in S611. If all of the versions match and there is no missing required software, then the integration proceeds to S610 and exits.

If one or more of the version numbers do not match, then the unmatched versions are updated on the clients with the correct versions in S612. In addition, if there is missing required software then it is updated on the clients in S612. The client integration is completed by installing the process software on the clients in S613. The integration proceeds to S610 and exits.

3. Virtual Private Networks

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called tunnel interfaces, where the packet enters and exits the network.

Figure 7:
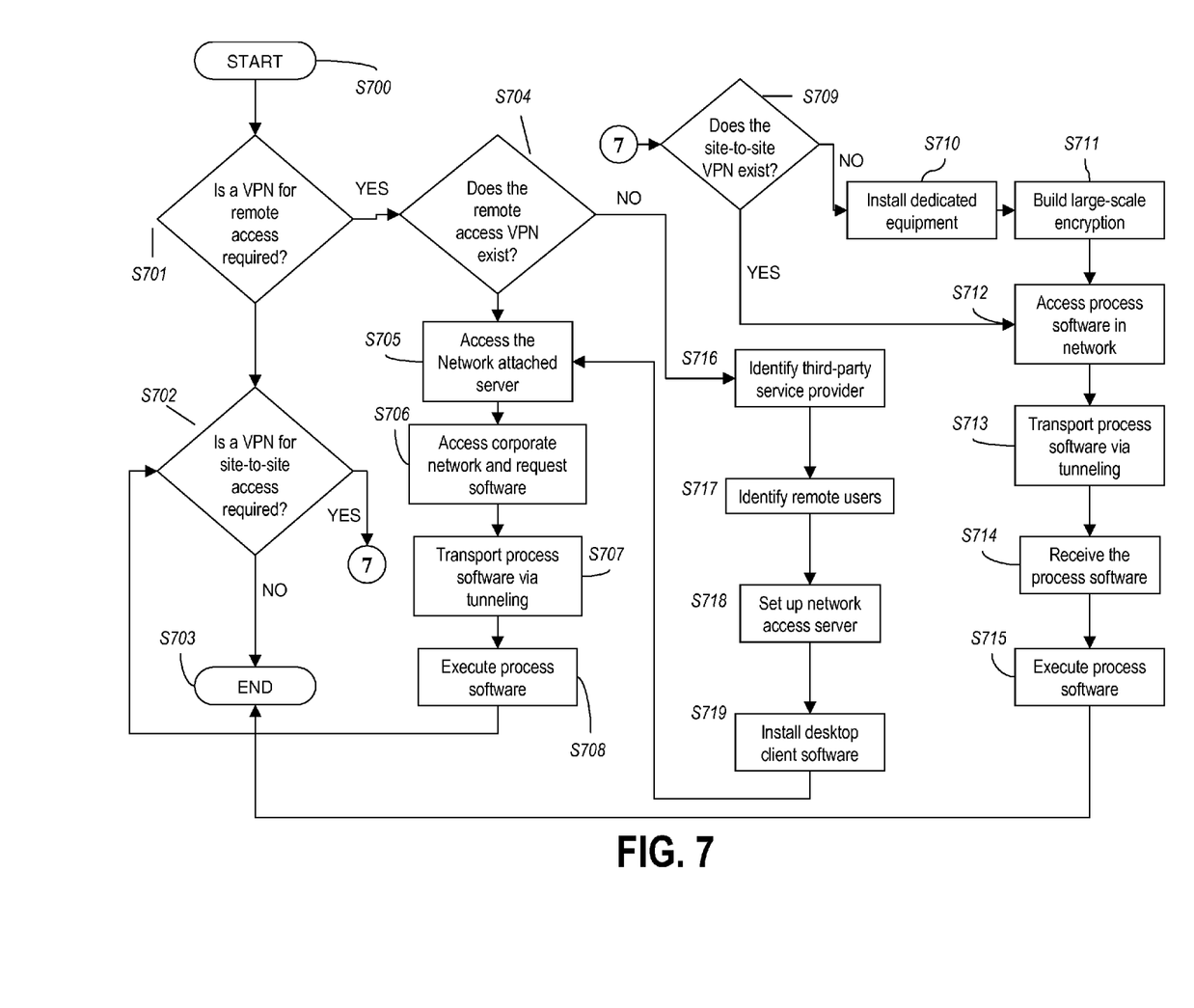
FIG. 7 is a flowchart showing the steps in checking to see if the service software may run on a Virtual Private Network.

In FIG. 7, Step S700 begins the Virtual Private Network (VPN) process. A determination is made to see if a VPN for remote access is required (S701). If it is not required, then the process proceeds to S702. If it is required, then determine if the remote access VPN exists S704.

If it does exist, then the process proceed to S705. Otherwise identify the third party provider that will provide the secure, encrypted connections between the company's private network and the company's remote users in S716. The company's remote users are identified in S717. The third party provider then sets up a network access server (NAS) in S718 that allows the remote users to dial a toll free number or attach directly via a cable or DSL modem to access, download and install the desktop client software for the remote-access VPN in S719.

After the remote access VPN has been built or if it been previously installed, the remote users can then access the process software by dialing into the NAS or attaching directly via a cable or DSL modem into the NAS (S705). This allows entry into the corporate network where the process software is accessed (S706). The process software is transported to the remote user's desktop over the network via tunneling. That is the process software is divided into packets and each packet including the data and protocol is placed within another packet (S707). When the process software arrives at the remote user's desktop, it is removed from the packets, reconstituted and then is executed on the remote users desktop in S708.

A determination is made to see if a VPN for site to site access is required in S702. If it is not required, then process proceeds to exit the process in S703. Otherwise, determine if the site to site VPN exists in S709. If it does exist, then the process proceeds to S712. Otherwise, install the dedicated equipment required to establish a site to site VPN (S710). Then build the large scale encryption into the VPN (S711).

After the site to site VPN has been built or if it had been previously established, the users access the process software via the VPN in S712. The process software is transported to the site users over the network via tunneling in S713. That is the process software is divided into packets and each packet including the data and protocol is placed within another packet in S714. When the process software arrives at the remote user's desktop, it is removed from the packets, reconstituted and is executed on the site users desktop in S715. Proceed to exit the process in S703.

It should be understood, that the invention is not necessarily limited to the specific process, arrangement, materials and components shown and described above, but may be susceptible to numerous variations within the scope of the invention. Additionally, a person skilled in the art will readily be able to implement the source code and means of implementing the invention.

What is claimed is:

1. A method for system resource management on a computer system, comprising:

storing first information regarding a plurality of hardware resources of the computer system on a data storage device;

storing second information regarding a plurality of environmental conditions of the computer system on the data storage device;

providing an interface for a calling entity to retrieve the first information and the second information from the data storage device;

determining a criteria that includes an environmental parameter and a hardware resource parameter;

calling the interface to retrieve a piece of the first information and a set of pieces of the second information respectively according to the hardware resource parameter and the environmental parameter in the criteria, the set of pieces of the second information corresponding to values of the environmental parameter at different times; and responsive to the calling, using the retrieved pieces of the first information and the retrieved set of pieces of the second information to manage system resources on the computer system, wherein the first and second information include historical information and predicted values.

2. The method of claim 1, further comprising responsive to the calling, executing an application utilizing the system resources.

3. The method of claim 2, wherein the computer system is a massively parallel machine.

4. The method of claim 1, wherein the calling entity is a scheduler.

5. The method of claim 1, wherein the interface conducts load balancing.

6. The method of claim 1, wherein the data storage device is a database.

7. The method of claim 1, wherein the calling occurs a plurality of times responsive to a request from the calling entity for reallocation of system resources.

8. The method of claim 1, wherein the interface is embodied as a software service that is deployable and integratable.

9. The method of claim 8, wherein the software service is on a virtual private network.

10. A computer program product for resource management on a computer system utilizing hardware and environmental factors, comprising:

a non-transitory computer usable medium having computer usable program code embodied therewith, the computer usable program code comprising:

instructions to store first information regarding a plurality of hardware resources of the computer system on a data storage device;

instructions to store second information regarding a plurality of environmental conditions of the computer system on the data storage device;

instructions to provide an interface for a calling entity to retrieve the first information and the second information from the data storage device;

instructions to determine a criteria that includes an environmental parameter and a hardware resource parameter;

instructions to call the interface to retrieve a piece of the first information and a set of pieces of the second information respectively according to the hardware resource parameter and the environmental parameter in the criteria, the set of pieces of the second information corresponding to values of the environmental parameter at different times; and instructions, responsive to the calling, to use the retrieved pieces of the first information and the retrieved set of pieces of the second information to manage system resources on the computer system, wherein the first and second information include historical information and predicted values.

11. The computer program product of claim 10, further comprising instructions, responsive to the calling, to execute an application utilizing the system resources.

12. The computer program product of claim 11, wherein the computer system is a massively parallel machine.

13. The computer program product of claim 10, wherein the calling entity is a scheduler.

14. The computer program product of claim 10, wherein the interface conducts load balancing.

15. The computer program product of claim 10, wherein the calling occurs a plurality of times responsive to a request from the calling entity for reallocation of system resources.

16. The computer program product of claim 10, wherein the interface is embodied as a software service that is deployable and integratable.

17. A computer system comprising:
  a processor;
  a memory operatively coupled with the processor;
  a storage device operatively coupled with the processor and the memory; and
  a computer program product for resource management on a computer system utilizing hardware and environmental factors, the computer program product comprising:
  a non-transitory computer usable medium having computer usable program code embodied therewith, the computer usable program code comprising:

instructions to store first information regarding a plurality of hardware resources of the computer system on a data storage device;

instructions to store second information regarding a plurality of environmental conditions of the computer system on the data storage device;

instructions to provide an interface for a calling entity to retrieve the first information and the second information from the data storage device;

instructions to determine a criteria that includes an environmental parameter and a hardware resource parameter;

instructions to call the interface to retrieve a piece of the first information and a set of pieces of the second information respectively according to the hardware resource parameter and the environmental parameter in the criteria, the set of pieces of the second information corresponding to values of the environmental parameter at different times; and instructions, responsive to the calling, to use the retrieved pieces of the first information and the retrieved set of pieces of the second information to manage system resources on the computer system, wherein the first and second information include historical information and predicted values.

\* \* \* \* \*